United States Patent

Moose, Jr. et al.

[15] 3,660,608

[45] May 2, 1972

[54] MEANS FOR REDUCING CROSS TALK IN MULTIPLEXED CIRCUITRY

[72] Inventors: Charles R. Moose, Jr., Canoga Park, Calif.; James L. Jenkins, Baltimore, Md.

[73] Assignee: The Bunker-Ramo Corporation, Canoga Park, Calif.

[22] Filed: Nov. 29, 1968

[21] Appl. No.: 779,726

[52] U.S. Cl. ....................................... 179/15 AN, 179/1.5 R

[51] Int. Cl. ........................................................... H04j 3/10

[58] Field of Search..........179/15 AN, 15 AP, 15 BL, 15 AE, 179/1.5 R, 1.5 S, 1.5 M, 1.5 E, 15 BC; 178/69 B, 22

[56] References Cited

UNITED STATES PATENTS 2,854,513 9/1958 Dow...............................179/15 ACS 2,907,830 10/1959 Boutry et al......................179/15 ACS 3,399,275 8/1968 Niertit et al...............................179/1.

*Primary Examiner*—Kathleen H. Claffy
*Assistant Examiner*—David L. Stewart
*Attorney*—Frederick M. Arbuckle

[57] ABSTRACT

A means for eliminating cross talk between multiplexed communication channels when such channels use a common phase-shifted "pseudo-random noise" sequence as a carrier. The cross talk is canceled, in each channel, by adding (or subtracting) a weighted sum of signals in all channels to the signal in that channel, either at the transmitting station or at the receiving station.

21 Claims, 4 Drawing Figures

INVENTORS
CHARLES R. MOOSE, JR.
JAMES L. JENKINS

INVENTOR.
CHARLES R. MOOSE, JR.
JAMES L. JENKINS
BY

MEANS FOR REDUCING CROSS TALK IN MULTIPLEXED CIRCUITRY

BACKGROUND OF THE INVENTION

The multiplexed communication system used in this invention is one in which sequences of bits are assigned to the communication channels as carriers. The sequences are derived from a shift register (called a pseudo-random sequence generator). The sequences used in the communication system of this invention are pseudo-random, and more particularly are maximum-length linear shift register sequences.

Pseudo-random generators, and the terms and definitions used herein, are described in "Digital Communications With Space Applications" by Solomon W. Golomb, et al., published by Prentice-Hall, Inc. in 1964, particularly between pages 8 and 11. Special attention is directed to the last paragraph of page 9 for a definition of a maximum-length linear shift register sequence.

Briefly, any pseudo-random sequence forming an output of a linear shift register, and having a period of $2^m-1$ bit periods, where $m$ is an integer, is a maximum-length linear shift register sequence.

To be pseudo-random, the sequence must satisfy the following properties:

1. (The Balance Property) In each period of the sequence the number of "1's" differs from the number of "0's" by at most one.

2. (The Run Property) Among the runs of "1's" and "0's" in each period, one-half of the runs of each kind are of length one, one-fourth of each kind are of length two, one-eighth are of length three, and so on as long as these fractions give meaningful numbers of runs.

3. (The Correlation Property) If a period of the sequence is compared, term by term, with any cyclic permutation of itself, the number of agreements differs from the number of disagreements by at most one.

In a more general situation, "$m$" stages of a shift register are connected to generate linear bipolar bit sequences of length $2^m-1=k$. With "$n$" channels to be multiplexed, the lengths of the registers may be extended to n stages, provided n is less than or equal to $2^m-1=k$. The sequence rate, according to Nyquist's Theorem, should be greater than twice the highest frequency to be transmitted in each channel. The bit rate is k times the sequence rate.

There are n independent signals which are to be transmitted through the n multiplexed channels to be described. Each analog signal is assumed to be a constant DC level during a single period of the $k$-digit pseudo-random sequence generator described above. This can be implemented by a "sample and hold" circuit which is entirely conventional and which need introduce essentially no distortion into the analog signal provided sequence generator periods are smaller than the Nyquist sampling interval defined in terms of the signal bandwidth, and provided that the sampled and held signal leads connected to the receiver are filtered according to conventional criteria. Conventional techniques for sampling, holding, and subsequently resolving analog signals will not be discussed, and for purposes of describing the multiplexed system, the input and output signals will be regarded as composed of constant level steps of duration equal to the pseudo-random sequence generator cycle time.

Signals are encoded for transmission through the multiplexed channel by multiplication (e.g. amplitude modulation) of each signal step by a pseudo-random sequence. Although sequence digits may be encoded and decoded in a variety of ways (e.g., DC Level, PSK, FSK, etc.) the transmitted signal is described herein, for convenience as impressed upon the carrier as amplitude modulation, and decoded at the receiver as such. It is convenient for description to regard the carrier pseudo-random sequence as a two-valued sequence of DC Levels, which may be regarded as representing "0's" and "1's," or "+1's" and "−1's."

Identical, synchronized registers are positioned at the transmitting and receiving stations. At the transmitter, in a conventional situation, the signal in each input channel is multiplied by a different pseudo-random sequence of pulses. The different pseudo-random sequences of pulses are related in that the order of the pulses in each of the sequences is the same; the different sequences differ in that they are out of phase, i.e., there is a time delay between them. In the typical situation, all of the multiplied signals are summed and transmitted over a single transmission channel.

The pseudo-random pulses may be bipolar. If they are not bipolar, a DC bias, for which compensation is needed, appears in the signal. The conversion of a non-polar to a bipolar signal is known and need not be described here. The following description is in terms of a bipolar sequence.

Typically, at the receiving station, the received signal is multiplied by signals of each of the pseudo-random sequences. It is a characteristic of the pseudo-random sequences that when a particular sequence is multiplied by itself, it produces a steady "1." When, however, two different pseudo-random sequences, having the same order, but shifted in time-phase by an integral number of bits, are multiplied together, a new sequence is produced which has the same properties as the original sequences except that it is inverted. After filtering to remove high frequency signals, the signal in each receiving channel is the signal corresponding to that in a single transmitting channel, minus a cross talk quantity representing the sum of the signals in all of the noncorresponding transmitting channels, divided by the number of bits, $k$, in a sequence.

SUMMARY OF THE INVENTION

The circuitry of this invention substantially reduces cross talk in such a multiplexed communication system using pseudo-random sequences. The first technique employed to reduce cross talk is to sum the demodulated and filtered signals in all of the receiving channels, to scale the resulting sum-signal to an amplitude which is $k/((k)\ (2-n+k)-(n-1))$ times the sum of the signals, and to add the resultant signal to $((k)\ (1-n+k))/((k)\ (2-n+k)-(n-1))$ times the signal in the channel being observed; each of the channels being monitored is treated in this same manner.

A second technique employed to reduce cross talk is to compensate for the cross talk at the transmitter. Typically all the input signals are summed, the resulting sum-signal is scaled to an amplitude which is $k/((k)\ (2-n+k)-(n-1))$ times the signal in the channel being pre-distorted; each of the input channels being pre-distorted is treated in this same manner before the signal in that channel is used to modulate the pseudo-random sequences.

It is therefore an object of this invention to reduce cross talk in multiplexing systems.

It is more particularly an object of this invention to reduce such cross talk in spread spectrum multiplexing systems of the type described.

It is still more particularly an object of this invention to reduce cross talk in multiplexed systems, using pseudo-random carriers, by additively combining compensating signals at the receiving channels.

It is also a still more particular object of this invention to reduce cross talk in multiplexed systems, using pseudo-random carriers, by additively combining compensating signals at the transmitting channels.

Other objects and advantages will become apparent when taken in connection with the accompanying drawings. The following is a

DESCRIPTION OF THE PREFERRED EMBODIMENTS

Figure 1:
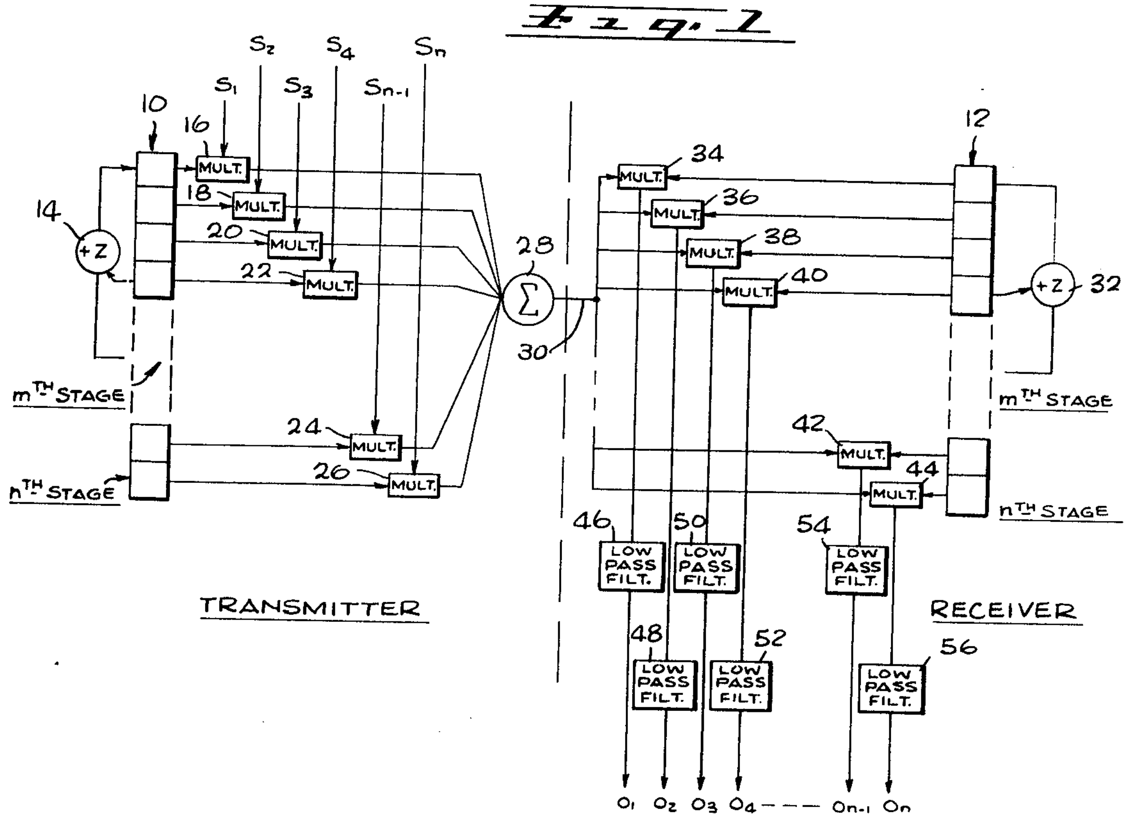
FIG. 1 is a schematic drawing of a typical multiplexed communication system with pseudo-random carriers.

In FIG. 1 is a schematic diagram of a typical multiplexed communication system with bipolar pseudo-random carriers.

In the transmitter section, a shift register 10 has "$n$" cells or stages, where $n$ is the number of communication channels to be multiplexed. In a typical situation, an "exclusive OR" gate 14 samples the outputs of the "$m$'th" and one or more intermediate stages. When only one of the sampled cells or stages registers a "1," a "1" signal is delivered to the first stage of the register 10. Timing signals at a frequency, "$f_o$", are delivered by a clock source 132 (shown in FIG. 3 only) to cause the shift register to shift. The sequence frequency, $f_o/k$, is at least twice the frequency, "$f_1$" of the highest signal frequency.

The output signal of each of the stages of the register 10 is a pseudo-random bit train, or sequence, which becomes a carrier for one of the signals to be transmitted. The output signals of each of the stages is the same, in the sense that the bits in each sequence have the same order. The output signals of each of the stages is different, in the sense that there is a time delay of one bit time between the carriers, i.e., the output signal of the second stage is delayed one bit time from the output signal of the first stage, the output signal of the third stage is delayed one bit time from the output signal of the second stage,..., and the output signal of the first stage is delayed ($k$—$n$+) bit times from the output signal of the "$n$'th" stage, where $k$=$2^m$—1.

The information signals $S_1...S_n$ are each multiplied, in multipliers 16, 18, 20, 22, 24 and 26, by a different bipolar pseudo-random sequence, i.e., the signal $S_1$ is multiplied by the output of the first stage of register 10, the signal $S_2$ is multiplied by the output of the second stage of register 10,..., the signal $S_n$ is multiplied by the output of the n'th stage of register 10. The resulting signals are each channeled to, and summed by, the summing circuit 28 which may be, for example, a summing amplifier. The summed signal is delivered to the transmission channel 30 which may be, for example, a wire or radio link.

At the receiving station, a register 12, identical to, and synchronized with, register 10 generates pseudo-random bit trains or sequences which are identical to the sequences generated by register 10.

The output signals of each of the stages of register 12 are multiplied in multipliers 34, 36, 38, 40, 42, and 44 by the signal received from communication link 30.

The outputs of the multipliers 34, 36, 38, 40, 42 and 44 are channeled through low pass filters 46, 48, 50, 52, 54 and 56 which have cutoff frequencies substantially at, or slightly above, the highest signal frequency, "$f_1$."

The outputs of the low pass filters are designated $O_1...O_n$, corresponding to the input signals $S_1...S_n$. However, unless compensation is applied at the transmitter, the output signals $O_1...O_n$ are not exact duplicates of the signals $S_1...S_n$, for cross talk occurs between the communication channels.

When a bipolar bit stream is multiplied by itself, the product, except for switching transients, is a steady positive signal. When two bipolar pseudo-random sequences, which are not in phase, are multiplied together, a new pseudo-random sequence is formed.

For explanation purposes, designate the pseudo-random bit trains, or sequences, produced by the stages 1 through n as $P_1...P_n$. The signal on communication link 30 may then be designated $S_1P_1+S_2P_2+...+S_nP_n$.

When, for example, the signal upon communication link 30 is multiplied by $P_1$, the signal presented to the low pass filter 46 is $S_1P_1P_1+S_2P_2P_1+...+S_nP_nP_1$. The $S_vP_vP_1$terms, where v is any integer from 2 to n, are the cross talk terms.

The products, $P_vP_w$, where $v$  $w$, produce new pseudo-random sequences $P_h$ which have the same bit sequence and bit frequency as the original sequences, but are inverted in amplitude, and are not necessarily in phase with any of the sequences $P_1...P_n$.

If the width of one bit of a sequence is designated $\Delta t$, and a pseudo-random sequence is designated $P(t)$, the designation $P(t+r\Delta<t)$ is $P(t)$ displaced in time. Pseudo-random sequences have an orthogonality-like quality in that $$\int_0^{K\Delta t} P(t)P(t+r\Delta t)dt = \begin{matrix} 1, \text{ when } r \equiv 0, \text{ module } k \\ -1/k, \text{ when } |r| > \Delta t \end{matrix}$$

A more hueristic way of saying the same thing is the following. Pseudo-random sequences form a multiplicative group: the product of two sequences that are not relatively shifted is a sequence of "1's". All pseudo-random sequences have one more "1" than "0's". Consequently the sum of terms in the product of two sequences, when the sum is taken over this sequence length, $k$ is proportional to "1" when the multiplied sequences are unshifted; it is proportional to $-1/k$ when the multiplied sequences are shifted.

The pseudo-random sequence duration must be less than or equal to the Nyquist interval for all of the information-bearing signals $S_j$. Thus each successive pseudo-random sequence in any given channel may be regarded as a carrier of one Nyquist sample of the signal in that channel. For example, a signal bandwidth of 4 kHz. requires a sequence repetition rate of 8 KHz or greater.

The signal $S_j$ in the $j^{th}$ channel may then be recovered by integrating the demodulator output in a low pass filter having an impulse response of duration equal to the pseudo-random sequence length. The output of such a filter, in the $j^{th}$ channel, is $$O_j(t) = \int_{-\infty}^{t} W(t)P(t)\left\{S_j(t)P(t) + \sum_{\substack{i=1 \\ i\neq j}}^{n} P(t+(i-j)\Delta t)S_i(t)\right\}dt$$

where $W(t)$ is the filter weighting function. If $W(t)$ is rectangular and of duration $k\Delta t$, then $$O_j(t) = \int_{0}^{k\Delta t} (1)P(t)\left\{S_j(t)P(t) + \sum_{\substack{i=1 \\ i\neq j}}^{n} P(t+(i-j)\Delta t)S_i(t)\right\}dt$$

If $S_j(t)$ is constant through the duration $k\Delta t$, between Nyquist samples of $S_j(t)$, then $$O_j(t) \cong S_j(t) - (1/k)\sum_{\substack{i=1 \\ i\neq j}}^{n} S_i(t)$$

which explicitly describes the cross talk, $(1/k)\sum_{\substack{i=1 \\ i\neq j}}^{n} S_i(t)$ in the $j^{th}$ channel.

Extending the equation for $O_j$ to all of the multiplexed communication channels, a matrix $O$ may be written in terms of a matrix $O$ and a matrix $S$ $$\begin{bmatrix} O_1 \\ O_2 \\ O_3 \\ \cdot \\ \cdot_{n-1} \\ O_n \\ O \end{bmatrix} = \begin{bmatrix} 1 & -1/k & -1/k & \cdot & \cdot & -1/k & -1/k \\ -1/k & 1 & -1/k & \cdot & \cdot & -1/k & -1/k \\ -1/k & -1/k & 1 & \cdot & \cdot & -1/k & -1/k \\ \cdot & \cdot & \cdot & \cdot & \cdot & \cdot & \cdot \\ \cdot & \cdot & \cdot & \cdot & \cdot & \cdot & \cdot \\ -1/k & -1/k & -1/k & \cdot & \cdot & 1 & -1/k \\ -1/k & -1/k & -1/k & \cdot & \cdot & -1/k & 1 \end{bmatrix} \begin{bmatrix} S_1 \\ S_2 \\ S_3 \\ \cdot \\ \cdot \\ S_{n-1} \\ S_n \end{bmatrix}$$

$$\hat{O} = \hat{Q}S$$

$Q^{-1}$ is non-singular and is of the form:

$$\begin{bmatrix} a & b & b & \cdot & \cdot & b & b \\ b & a & b & \cdot & \cdot & b & b \\ b & b & a & \cdot & \cdot & b & b \\ \cdot & \cdot & \cdot & \cdot & \cdot & \cdot & \cdot \\ \cdot & \cdot & \cdot & \cdot & \cdot & \cdot & \cdot \\ b & b & b & \cdot & \cdot & a & b \\ b & b & b & \cdot & \cdot & b & a \end{bmatrix}.$$

This is a patterned matrix whose elements $a$, $b$, are in general, °$(-2k)(-2k-1)$ and $(\pm K)/((-2k-1)(-k-1))$, respectively, when $n=k$, i.e., when all available channels are utilized. When $n$ is less than $k$, then $a=(k)(2-n+k)/((k)(2-n+k)-(n-1))$, and $b=k/((k)(2-n+k)-(n-1))$. The matrix equation $\hat{O}=Q\hat{S}$, indicates that 1. Cross talk terms can be removed from the array of outputs by multiplying it by $Q^{-1}$: $Q^{-1}\hat{Q}=Q^{-1}Q\hat{S}=I\hat{S}=\hat{S}$.

2. The array of input signals may be predistorted at the transmitter by multiplying them by $Q^{-1}$ in order to eliminate cross talk terms. If the predistorted signal collection $\hat{S}'=Q^{-1}\hat{S}$ were transmitted, the output would be $Q=Q\hat{S}'=QQ^{-1}\hat{S}=\hat{S}$ The equation $S=Q^{-1}O$ may be refractored into the form $$\begin{bmatrix} S_1 \\ S_2 \\ S_3 \\ \cdot \\ \cdot_{n-1} \\ S_n \\ S \end{bmatrix} = \left\{ b \begin{bmatrix} 1 & 1 & 1 & \cdot & \cdot & 1 & 1 \\ 1 & 1 & 1 & \cdot & \cdot & 1 & 1 \\ 1 & 1 & 1 & \cdot & \cdot & 1 & 1 \\ \cdot & \cdot & \cdot & \cdot & \cdot & \cdot & \cdot \\ \cdot & \cdot & \cdot & \cdot & \cdot & \cdot & \cdot \\ 1 & 1 & 1 & \cdot & \cdot & 1 & 1 \\ 1 & 1 & 1 & \cdot & \cdot & 1 & 1 \end{bmatrix} + (a-b) \begin{bmatrix} 1 & 0 & 0 & \cdot & \cdot & 0 & 0 \\ 0 & 1 & 0 & \cdot & \cdot & 0 & 0 \\ 0 & 0 & 1 & \cdot & \cdot & 0 & 0 \\ \cdot & \cdot & \cdot & \cdot & \cdot & \cdot & \cdot \\ \cdot & \cdot & \cdot & \cdot & \cdot & \cdot & \cdot \\ 0 & 0 & 0 & \cdot & \cdot & 1 & 0 \\ 0 & 0 & 0 & \cdot & \cdot & 0 & 1 \end{bmatrix} \right\} \begin{bmatrix} O_1 \\ O_2 \\ O_3 \\ \cdot \\ \cdot \\ O_{n-1} \\ O_n \end{bmatrix}$$

Figure 2:
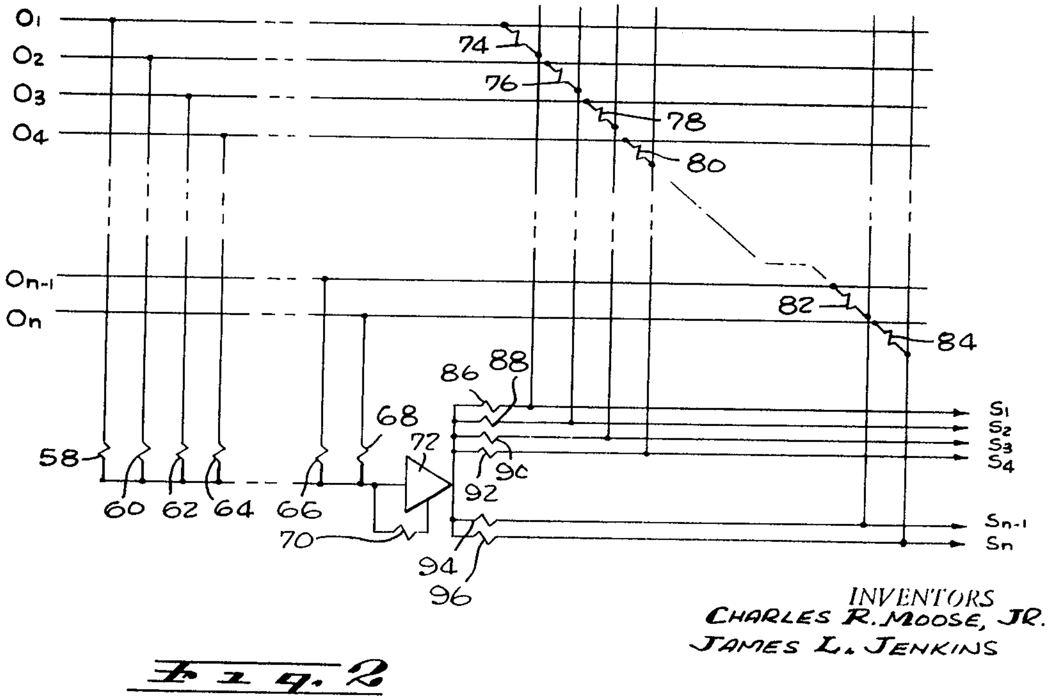
FIG. 2 is a schematic drawing of one circuit which may be connected to the receiving portion of the circuit of FIG. 1 to reduce cross talk.

The circuit of FIG. 2 mechanizes this equation. The resistances of resistors, 58, 60, 62, 64, 66 and 68 are identical. So too are the resistances of resistors 86, 88, 90, 92, 94 and 96 identical. The resistances of resistors 74, 76, 78, 80, 82 and 84 are identical. The summing amplifier 72 injects a signal into one input channel of each of n two-input summing amplifiers (not shown), one in each of the n output channels, through summing amplifier input resistors $R_{86}$, $R_{88}$,...$R_{96}$. The resultant signal at the output of the summing amplifier in each channel ($S_1$, $S_2$,...$S_n$) represents the contribution of the first term of the matrix equation, (above). The component of the output corresponding to the second term in the matrix equation is injected into the second input channel of each of the two input summing amplifiers (not shown), respectively through resistors $R_{74}$, $R_{76}$,...$R_{84}$. (The amplifier 72 is assumed to have a non-inverting output.) The resistors of the circuit of FIG. 2 are chosen to make the scaling conform to the above matrix equations. That is, $R_{70}/R_{58} = R_{70}/R_{60} = R_{70}/R_{62} = ... = R_{70}/R_{68} = b$. Furthermore, $R_{74}/R_{86} = R_{76}/R_{88} = ... = R_{84}/R_{96} = 1/(a-b)$. It will be noted that by proper scaling, resistors $R_{74}$ through $R_{84}$ and $R_{86}$ through $R_{96}$ may be made to have the same value.

Figure 3:
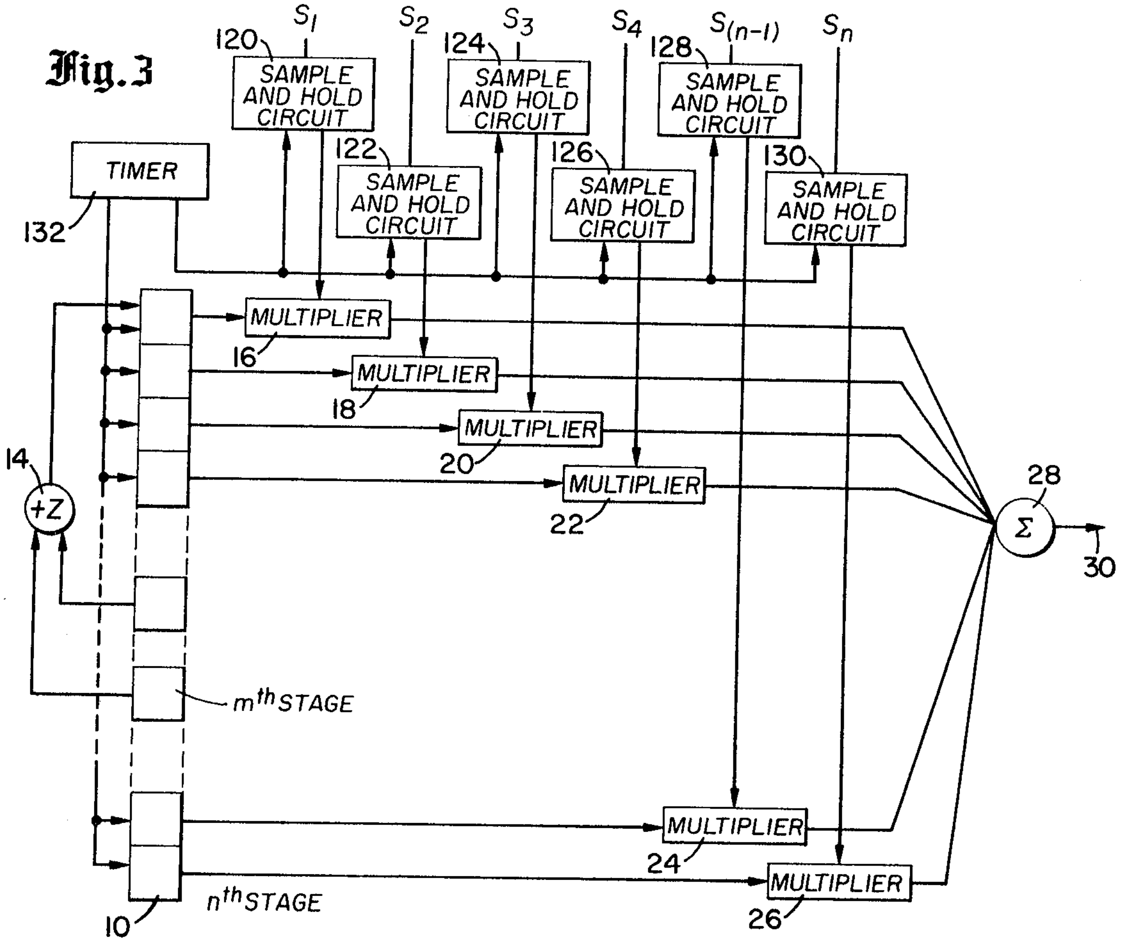
FIG. 3 is a schematic diagram of the transmitting portion of the circuit of FIG. 1 with sample-and-hold circuits added into the signal channels.

A preferred circuit of the transmitting portion of the multiplexed system is shown in FIG. 3. Although the operation of the circuit of FIG. 1 operates satisfactorily at low frequencies, as the Nyquist frequency is approached exact cancellation becomes more difficult. Consequently the circuit of FIG. 3 is preferred wherein each of the input signals is sampled by the sample and hold circuits 120, 122, 124, 126, 128 and 130. The sampling of the sample and hold circuits is synchronized with the timing of the register 10 by the timer 132. The timer 132 sends a sample and hold command to the sample and hold circuits once each "$k$" pulses, i.e., once each sequence period of the register 10. In the interim, the signals applied by the sample and hold circuits to the multipliers 16...26 are constant.

Figure 4:
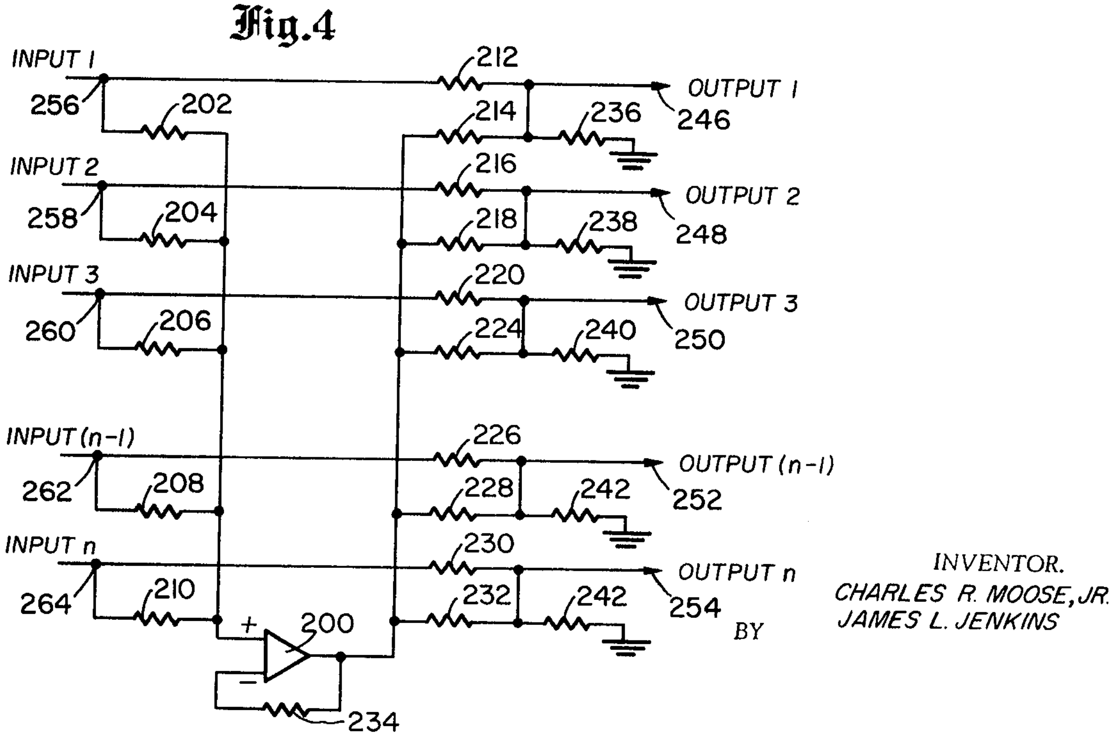
FIG. 4 is a circuit schematic of a preferred embodiment of the cross talk reducing circuit of this invention which is adapted to be connected either to the transmitting or receiving portions of FIGS. 1 or 3.

The circuit of FIG. 4 is an alternate embodiment of the circuit of FIG. 2. The circuit of FIG. 4 may be placed in front of the multipliers 16...26 in FIGS. 1 or 3 (in which event the inputs would be designated $S_1$...$S_n$ and the outputs would be designated $S'_1$...$S'_n$, modified input signals). Also the circuit of FIG. 4 may instead be connected to the output terminals of FIG. 1, thus producing the signals $S_1$...$S_n$, which are the undistorted input signals.

Thus the circuits of this invention substantially eliminate cross talk in pseudo-random sequence modulated multiplexed systems. This is accomplished in a deterministic manner by subtracting out the predicted cross talk signal either at the receiver or at the transmitter. Further, the effectiveness of the cross talk elimination is enhanced by using sample and hold circuits to cause the signal to remain substantially constant over the period of one sequence of the pseudo-random carrier.

Although the invention has been described in detail above, it is not intended that the invention should be limited by that description, but only in accordance with the following claims.

We claim:

1. In a multiplexed communication system using a plurality of identical phase-displaced pseudo-random sequence carrier signals in which said sequences are maximum-length linear shift register sequences of bit length "$k$," the sequence frequency of said sequences is at least twice that of the highest frequency of said signals to be communicated, including means positioned at transmitting and receiving ends of said system for generating said carrier signals, having a plurality of signals to be communicated, having means at said transmitting end for multiplying each of said signals to be communicated by a different one of said carrier signals, having means at said transmitting end for summing said multiplied signals, having a plurality of multiplying means at said receiving end for multiplying said summed signal by a plurality of said pseudo-random carrier signals and for channeling said last-named multiplied signals into different channels which are equal in number to the number of signals to be communicated, having means in each of said channels to filter out frequencies above the known highest frequency of said signals to be communicated to cause said signals in each of said channels to be substantially identical to said signals to be communicated but including cross talk between channels, the improvement comprising cross-talk compensating means for introducing into said system at least one signal which is substantially equal in amplitude and opposite in sign to at least one of said cross talk signals to cancel said cross talk, said cross-talk compensating means including:

means for scaling said channeled signals, "$O_q$" by a factor "$b$";

means for adding signals of the form $(a-b)\ O_t$ to the sum, $$b \sum_{q=1}^{n} O_q$$

of said scaled signals;

wherein "$n$" is the total number of channeled signals, "$a$" is the diagonal factor, and "$b$" is the off-diagonal factor of the inverse $Q^{-1}$ of a coefficient matrix, "$Q$" of the form $$Q=\begin{bmatrix} 1 & -1/k & -1/k & \cdot\ \cdot & -1/k & -1/k \\ -1/k & 1 & -1/k & \cdot\ \cdot & -1/k & -1/k \\ -1/k & -1/k & 1 & \cdot\ \cdot\ \cdot & -1/k & -1/k \\ \cdot & \cdot & \cdot & \cdot\ \cdot\ \cdot & & \cdot \\ \cdot & \cdot & \cdot & \cdot\ \cdot\ \cdot & & \cdot \\ -1/k & -1/k & -1/k & \cdot\ \cdot & 1 & -1/k \\ -1/k & -1/k & -1/k & \cdot\ \cdot & -1/k & 1 \end{bmatrix}$$

2. Apparatus as recited in claim 1 and further comprising timing means for timing said sequences, and a plurality of sample and hold means each connected to receive, sample, and hold one of said signals to be communicated over the period of one of said sequences.

3. In a multiplexed communication system using a plurality of identical phase-displaced pseudo-random sequence carrier signals in which said sequences are maximum-length linear shift register sequences of bit length "$k$," the sequence frequency of said sequences is at least twice that of the highest frequency of said signals to be communicated, including means positioned at transmitting and receiving ends of said system for generating said carrier signals, having a plurality of signals to be communicated, having means at said transmitting end for multiplying each of said signals to be communicated by a different one of said carrier signals, having means at said transmitting end for summing said multiplied signals, having a plurality of multiplying means at said receiving end for multiplying said summed signal by a plurality of said pseudo-random carrier signals and for channeling said last-named multiplied signals into different channels which are equal in number to the number of signals to be communicated, having means in each of said channels to filter out frequencies above the known highest frequency of said signals to be communicated to cause said signals in each of said channels to be substantially identical to said signals to be communicated but including cross talk between channels, the improvement comprising cross-talk compensating means for introducing into said system at least one signal which is substantially equal in amplitude and opposite in sign to at least one of said cross talk signals to cancel said cross talk, said cross-talk compensating means including:

means for adding signals of the form $$k/((k)(2-n+k)-(n-1)) \sum_{j=1}^{n} O_j \text{ to}$$

$K(1-n+k)\ /\ ((k)\ (2-n+k)\ -\ (n-1))$ times of each of said channeled signals, "$O_j$," wherein "$n$" is the total number of channeled signals.

4. Apparatus as recited in claim 3 and further comprising timing means for timing said sequences, and a plurality of sample and hold means each connected to receive, sample, and hold one of said signals to be communicated over the period of one of said sequences.

5. In a multiplexed communication system using a plurality of identical phase-displaced pseudo-random sequence carrier signals in which said sequences are maximum-length linear shift register sequences of bit length "k," the sequence frequency of said sequences is at least twice that of the highest frequency of said signals to be communicated, including means positioned at transmitting and receiving ends of said system for generating said carrier signals, having a plurality of signals to be communicated, having means at said transmitting end for multiplying each of said signals to be communicated by a different one of said carrier signals, having means at said transmitting end for summing said multiplied signals, having a plurality of multiplying means at said receiving end for multiplying said summed signal by a plurality of said pseudo-random carrier signals and for channeling said last-named multiplied signals into different channels which are equal in number to the number of signals to be communicated, having means in each of said channels to filter out frequencies above the known highest frequency of said signals to be communicated to cause said signals in each of said channels to be substantially identical to said signals to be communicated but including cross talk between channels, the improvement comprising cross-talk compensating means for introducing into said system at least one signal which is substantially equal in amplitude and opposite in sign to at least one of said cross talk signals to cancel said cross talk, said cross-talk compensating means including:

means for adding signals of the form $$k/((k)(2-n+k)-(n-1)) \sum_{j=1}^{n} O_j \text{ to}$$

$k\ (1-n+k)/((k)\ (2-n+k)\ -\ n-1))$ times each of said signals, $S_j$, to be communicated, wherein $n$ is the total number of signals to be communicated.

6. Apparatus as recited in claim 5 and further comprising timing means for timing said sequences, and a plurality of sample and hold means each connected to receive, sample, and hold one of said compensated signals over the period of one of said sequences.

7. In a multiplexed communication system using a plurality of identical phase-displaced pseudo-random sequence carrier signals in which said sequences are maximum-length linear shift register sequences of bit length "$k$," the sequence frequency of said sequences is at least twice that of the highest frequency of said signals to be communicated, including means positioned at transmitting and receiving ends of said system for generating said carrier signals, having a plurality of signals to be communicated, having means at said transmitting end for multiplying each of said signals to be communicated by a different one of said carrier signals, having means at said transmitting end for summing said multiplied signals, having a plurality of multiplying means at said receiving end for multiplying said summed signal by a plurality of said pseudo-random carrier signals and for channeling said last-named multiplied signals into different channels which are equal in number to the number of signals to be communicated, having means in each of said channels to filter out frequencies above the known highest frequency of said signals to be communicated to cause said signals in each of said channels to be substantially identical to said signals to be communicated but including cross talk between channels, the improvement comprising cross-talk compensating means for introducing into said system at least one signal which is substantially equal in amplitude and opposite in sign to at least one of said cross talk signals to cancel said cross talk, said cross-talk compensating means including:

timing means for timing said sequences, and a plurality of sample and hold means each connected to receive, sample, and hold one of said signals to be communicated over the period of one of said sequences; and means for adding signals of the form $$k/((k)(2-n+k)-(n-1))\sum_{j=1}^{n} O_j \text{ to}$$

$k/(1-n+k)/((k)(2-n+k)-(n-1))$ times each of said sampled and held signals, $H_j$, wherein n is the total number of signals to be communicated.

8. In combination:

timing means;

a first pseudo-random sequence carrier generator, responsive to said timing means to generate a plurality of identical, phase-displaced, maximum-length linear shift register sequences of bit length "$k$";

a first n-plurality of multipliers, each connected to said carrier generator to receive a different one of said phase-displaced sequences, wherein "$n$" is less than or equal to "$k$" and is equal to the number of communication channels of a multiplexed communication system;

at least one and not more than n communication signal means, each of said communication signal means being connected to a different one of said multipliers; and cross talk compensation means for conditioning each of said communication signals in response to predetermined scaled amplitudes of all of said communication signals.

9. Apparatus as recited in claim 8 in which said cross talk compensation means comprises:

means for summing and scaling all of said communication signals, "$S_j$" by a factor, $k/((k)(2-n+k)-(n-l))$; and means for adding said summed signal to each of said communication signals times $k(1-n+k)/((k)(2-n+k)-(n-1))$.

10. Apparatus as recited in claim 9 and further comprising:

summing means for summing all of the output signals of said multipliers;

transmission means for transmitting said last-named summed signal; and receiving means, including means for demodulating pseudo-random multiplexed signals, for receiving and demodulating said transmitted signal.

11. Apparatus as recited in claim 9 and further comprising a plurality of sample and hold means, each connected between a different communication signal means and one input of said compensation means to receive, sample, and hold one of said communication signals over a period of one of said sequences.

12. Apparatus as recited in claim 11 and further comprising:

summing means for summing all of the output signals of said multipliers;

transmission means for transmitting said last-named summed signal; and receiving means, including means for demodulating pseudo-random multiplexed signals, for receiving and demodulating said transmitted signal.

13. Apparatus as recited in claim 9 and further comprising a plurality of sample and hold means each connected between one output of said compensation means and one of said multipliers, to receive, sample, and hold one of said compensated signals over a period of one of said sequences.

14. Apparatus as recited in claim 13 and further comprising:

summing means for summing all of the output signals of said multipliers;

transmission means for transmitting said last-named summed signal; and receiving means, including means for demodulating pseudo-random multiplexed signals, for receiving and demodulating said transmitted signal.

15. In combination:

timing means;

a first pseudo-random sequence carrier generator, responsive to said timing means to generate at least an $n$-plurality of identical, phase-displaced, maximum-length linear shift register sequences of bit length "$k$," wherein "$n$" is the number of communication channels in a multiplexed communication system and is less than or equal to "$k$";

an n-plurality of multipliers, each connected to said carrier generator to receive a different one of said phase-displaced sequences, all of said multipliers being connected to receive a multiplexed, pseudo-random carrier communication signal whose carrier sequences are identical with the sequences generated by said carrier generator;

a plurality of low pass filter means, each connected to the output terminals of a different said multiplier, and adapted to pass frequencies below one-half of the sequence frequency of said carrier generator; and cross talk compensation means for conditioning each of said filtered signals in response to predetermined scaled amplitudes of all of said filtered signals.

16. Apparatus as recited in claim 15 in which said cross talk compensation means comprises:

means for summing and scaling all of said filtered signals, "$O_j$", by a factor $k/((k)(2-n+k)-(n-1))$; and means for adding said summed signal to each of said filtered signals times $k(1-n+k)/((k)(2-n+k)-(n-1))$.

17. Apparatus as recited in claim 16 and further comprising:

transmitting means for transmitting said multiplexed, pseudo-random carrier communication signal, including means for generating an $n$-plurality of pseudo-random, maximum-length linear shift register sequences if bit length "$k$," means for modulating at least one of said sequences with a communication signal to be transmitted, and means for summing said modulated signals for transmission.

18. Apparatus as recited in claim 17 and further comprising:

a plurality of sample and hold circuits, equal in number to the number of communication signals to be transmitted, each connected to receive, sample, and hold a different one of said communication signals over one period of said sequences.

19. Apparatus as recited in claim 15 in which said cross talk compensation means comprises:

means for scaling said filtered signals, "$O_q$" by a factor "$b$";

means for adding signals, of the form $(a-b)\,O_1$, to the sum b $$b\sum_{q=1}^{n} O_q$$

of said scaled signals;

wherein "$a$" is the diagonal term, and "$b$" is the offdiagonal term of the inverse, $Q^{-1}$, of a coefficient matrix, $Q$, of the form $$\begin{bmatrix} 1 & -1/k & -1/k & \cdot & \cdot & -1/k & -1/k \\ -1/k & 1 & -1/k & \cdot & \cdot & -1/k & -1/k \\ -1/k & -1/k & 1 & \cdot & \cdot & -1/k & -1/k \\ \cdot & \cdot & \cdot & \cdot & \cdot & \cdot & \cdot \\ \cdot & \cdot & \cdot & \cdot & \cdot & \cdot & \cdot \\ -1/k & -1/k & -1/k & \cdot & \cdot & 1 & -1/k \\ -1/k & -1/k & -1/k & \cdot & \cdot & -1/k & 1 \end{bmatrix}$$

20. Apparatus as recited in claim 19 and further comprising:

transmitting means for transmitting said multiplexed, pseudo-random carrier communication signal, including means for generating an n-plurality of pseudo-random, maximum-length linear shift register sequences of bit length "$k$," means for modulating at least one of said sequences with a communication signal to be transmitted, and means for summing said modulated signals for transmission.

21. Apparatus as recited in claim 20 and further comprising: a plurality of sample and hold circuits, equal in number to the number of communication signals to be transmitted, each connected to receive, sample, and hold a different one of said communication signals over one period of said sequences.

* * * * *